United States Patent [19]

Barske et al.

[11] Patent Number: 4,590,568
[45] Date of Patent: May 20, 1986

[54] METHOD OF AND DEVICE FOR OPERATING A MOTOR VEHICLE AT A RATE OF FUEL CONSUMPTION RELATED TO DISTANCE

[75] Inventors: Heiko Barske, Ingolstadt; Bernd Posch, Munich, both of Fed. Rep. of Germany

[73] Assignee: Audi AG, Ingolstadt, Fed. Rep. of Germany

[21] Appl. No.: 539,188

[22] Filed: Oct. 5, 1983

[30] Foreign Application Priority Data

Oct. 6, 1982 [DE] Fed. Rep. of Germany ....... 3236990

[51] Int. Cl.[4] .......................................... G01M 15/00
[52] U.S. Cl. .................................. 364/442; 364/424; 73/114
[58] Field of Search ........... 364/442, 424, 426, 431.07; 73/113, 114; 377/21

[56] References Cited

U.S. PATENT DOCUMENTS

| | | | |
|---|---|---|---|
| 3,967,097 | 6/1976 | Moretti | 364/442 |
| 4,046,998 | 9/1977 | Kuno et al. | 73/113 |
| 4,217,644 | 8/1980 | Kato et al. | 377/21 |
| 4,247,757 | 1/1981 | Crump, Jr. | 73/114 |
| 4,344,136 | 8/1982 | Panik | 364/424 |
| 4,400,779 | 8/1983 | Kosuge et al. | 73/114 |
| 4,434,469 | 2/1984 | Suzuki et al. | 364/426 |
| 4,463,427 | 7/1984 | Bonnetain et al. | 364/442 |
| 4,479,184 | 10/1984 | Nakano | 364/426 |

Primary Examiner—Gary Chin
Attorney, Agent, or Firm—Karl Hormann

[57] ABSTRACT

A method of and system for automatically operating an automotive vehicle in such a manner that a desired distance may be driven with a given quantity of fuel. The system is such that after a rate of fuel consumption has been determined on the basis of the fuel available and the distance to be driven, for instance, a control monitors and adjusts the output of the engine of the vehicle appropriately. Manual operation of the vehicle in this manner is made possible by actuating perceptible warning signals whenever the vehicle is operated in a manner deviating from the desired performance.

19 Claims, 3 Drawing Figures

METHOD OF AND DEVICE FOR OPERATING A MOTOR VEHICLE AT A RATE OF FUEL CONSUMPTION RELATED TO DISTANCE

BACKGROUND OF THE INVENTION

This invention relates generally to controlling the fuel consumption of an internal combustion engine and, more particularly, to a method of and device for controlling the fuel consumption of a motor vehicle in such a manner that a predetermined distance may be covered with a given quantity of fuel.

Devices have become known which indicate to the driver of a motor vehicle the rate of fuel consumption at any given instant. Such devices exert no active control over the fuel consumption of the engine, however. Any changes in the rate of consumption to a desired level have to be made by the driver on the basis of empirical calculations.

Aside from fuel consumption indicators so-called cruise controls are known which permit operating a motor vehicle at a constant pre-set speed without consideration of fuel consumption, however.

While in the case of the former device fuel economy may be attained by the driver monitoring the indicator and adjusting his speed as required to reduce consumption, and while cruise controls may be set to operate vehicles at speeds which yield low fuel consumption rates, there is an obvious need for control devices which permit automatic operation of motor vehicles in such a manner that predetermined distances may be driven with a predetermined fuel supply, independently of any action on the part of drivers. The advantages of such control systems in terms of fuel efficiency or energy conservation are deemed to be obvious and may come into play whenever speed is of subordinate importance and when a destination is to be reached at the lowest possible fuel cost, or whenever a given destination is to be reached with a given quantity of fuel in the shortest possible time.

It is an object of the invention to provide a control device by means of which an automobile may be operated automatically to cover a predetermined distance with an available supply of fuel.

A further object is to provide a system by which a driver may program his automobile in preparation of driving a predetermined distance with the fuel carried in the tank of the vehicle.

Another object of the invention resides in the provision of a method which permits operating a motor vehicle automatically at a minimum rate of fuel consumption.

A still further object resides in the provision of a method which permits driving an automobile in such a manner that a given fuel supply will cover a predetermined distance automatically without corrective action by a driver.

A still further object of the invention is to provide a system which on the basis of manually input parameters permits automatic operational control over the engine of a motor vehicle to cover a predetermined distance with a predetermined quantity of fuel.

It is also an object of the invention to provide for a control system for automotive engines which permits their automatic operation without surges in fuel consumption and without undue variations in speed.

SUMMARY OF THE INVENTION

In the accomplishment of these and other objects the invention provides for means by which a desired fuel consumption rate may be preset, means for measuring the actual fuel consumption, and means for comparing, and for generating a signal when there is a difference between, the desired rate of fuel consumption and the actual rate of consumption.

In a further advantageous embodiment the signal is used to trigger an audible and/or visible alarm, particularly when actual consumption exceeds desired consumption.

In a particularly advantageous embodiment of the invention the signal may be employed as a control signal for adjusting an output control member of a drive train of an automotive vehicle in such a manner that any difference between the actual rate of fuel consumption and the desired rate of consumption is eliminated or at least substantially reduced.

Advantageously the invention provides for means for measuring available fuel and for determining a distance to be driven, and means for calculating the permissible rate of fuel consumption on the basis of these parameters.

Preferably the result of the calculation is used to control the operation of an internal combustion engine automatically in such a manner that the distance may be driven with the available fuel, there being provided means for controlling and, if required, resetting the engine appropriately.

These and other objects of the invention will become apparent from the detailed description taken together with the attached drawings. The scope of protection sought, however, is to be determined by the appended claims.

DESCRIPTION OF THE PREFERRED EMBODIMENT

Figure 1:
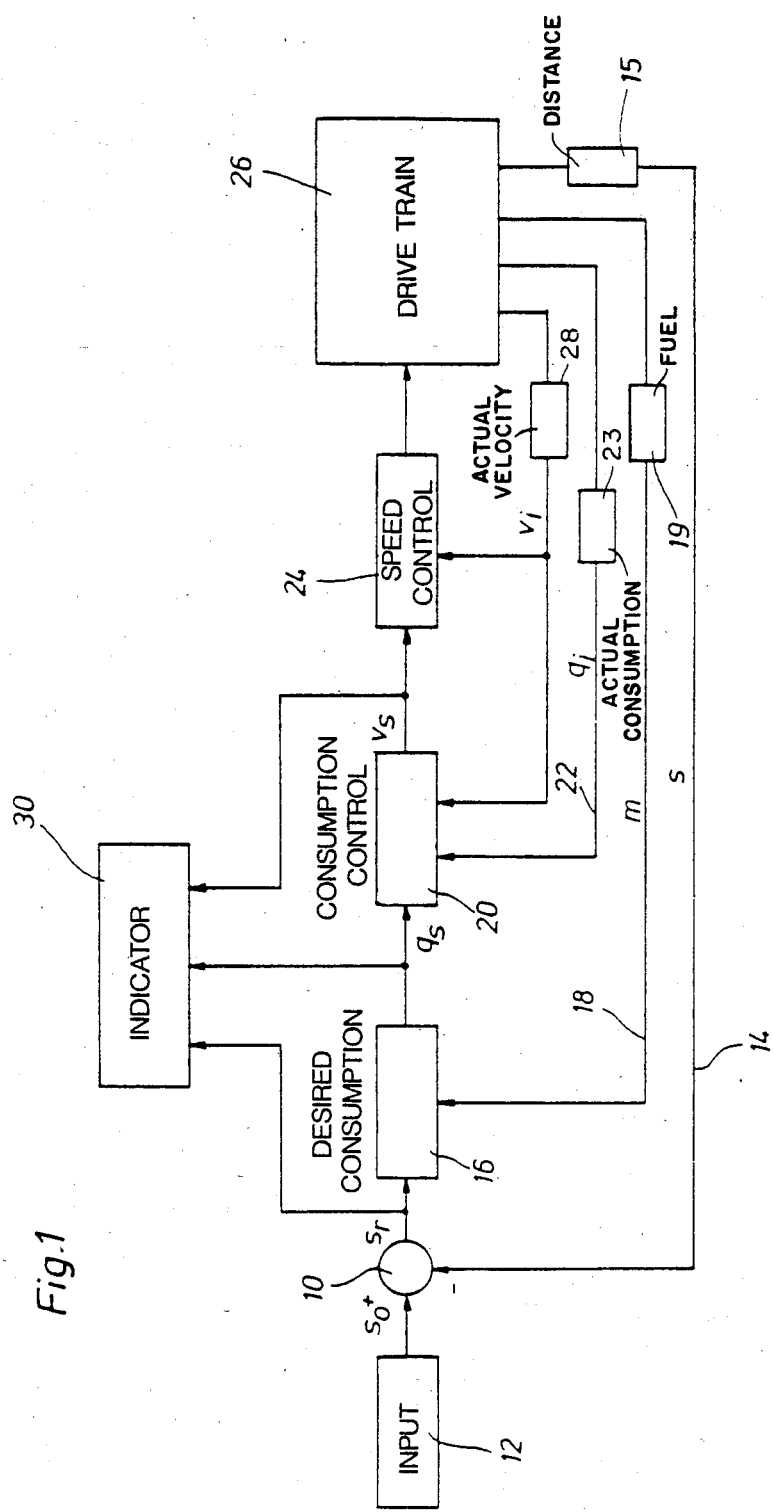
FIG. 1 is a block diagram of the device in accordance with the invention as applied to a motor vehicle.

As shown in FIG. 1 a subtractor 10 is provided with an input unit 12 by means of which a signal $s_o$ corresponding to a total distance to be driven may be manually generated preparatory to a trip. During the trip a distance measuring device 15 provided with electronic controls generates a signal s corresponding to the distance already driven. The signal s is fed to the subtractor 10 by way of a line 14. On the basis of the signals $s_o$ and s the subtractor 10 calculates a signal $s_r$ which corresponds to the distance yet to be driven. The signal $s_r$ is fed to one input of a divider 16.

Another input of the divider 16 is connected by a line 18 to a conventional fuel measuring means 19, such as a fuel gauge, provided with suitable electronic controls. The fuel measuring means 19 generates a signal m which corresponds to the quantity of available fuel. The divider 16 calculates the permissible or desired rate of fuel consumption $q_s$ on the basis of m and $s_r$. A signal $q_s$ is fed to one input of a fuel consumption control 20 the construction or arrangement of which will be described infra in detail. An appropriate sensor 23 generates a signal $q_i$ corresponding to the actual rate of fuel consumption. The signal $q_i$ is fed to another input of the fuel consumption control 20 by way of a line 22. The sensor 23 may, for instance, be associated with a carburator or fuel injector. A conventional speed measuring means 28, such as a speedometer, provided with electronic controls, generates a signal $v_i$ corresponding to the actual speed of the vehicle. The signal $v_i$ is fed to a third input of the consumption control 20 and to one input of a speed control 24. Another input of the speed control 24 is connected to the output of the consumption control 20 from which it receives a control parameter $v_s$. The output of the speed control is connected to an output control member, for instance a fuel intake valve, of an internal combustion engine not shown but part of a schematically depicted drive train 26 of an automotive vehicle. The output signal of the speed control 24 may be used to adjust the position of the output control member such that $v_i$ substantially equals $v_s$.

As indicated in FIG. 1 the signals $s_r$, $q_s$, and $v_s$ may be rendered perceptible by an indicator unit 30.

The components referred to above may be of conventional construction. The principle of operation of the system is substantially as follows:

Initially a distance $s_o$ to be driven with an available quantity of fuel m is set in the input unit 12. By division of m and $s_o$ the divider 16 determines the permissible rate of fuel consumption $q_s$. The permissible consumption rate $q_s$ is compared against the actual consumption $q_i$ in the consumption control 20. In case of deviation between $q_s$ and $q_i$ the consumption control 20 adjusts the control parameter $v_s$ of the speed control 24 such that the speed of the vehicle and, therefore, the rate of fuel consumption are reduced if $q_i$ exceeds $q_s$, and vice versa. The consumption control 20 may be set so that in a stationary condition $q_i$ substantially equals $q_s$. By way of the subtractor 10 in which the driven distance s is subtracted from the total distance $s_o$, and the divider 16, the rate of consumption permissible for covering the desired distance is continually reset or updated.

The remaining distance $s_r$, the permissible rate of consumption $q_s$, and the permissible speed $v_s$ at any given moment may be indicated in the indicator 30.

When the vehicle is operated without automatic speed control, i.e. when the driver controls the accelerator, an acoustical or optical indicator in the unit 30 may be actuated whenever actual consumption $q_i$ exceeds permissible consumption $q_s$. In the absence of a speed control 24 the output signal $v_s$ of the consumption control 20 may be utilized directly to control the position of the output control member of the combustion engine to affect its output.

Figure 2:
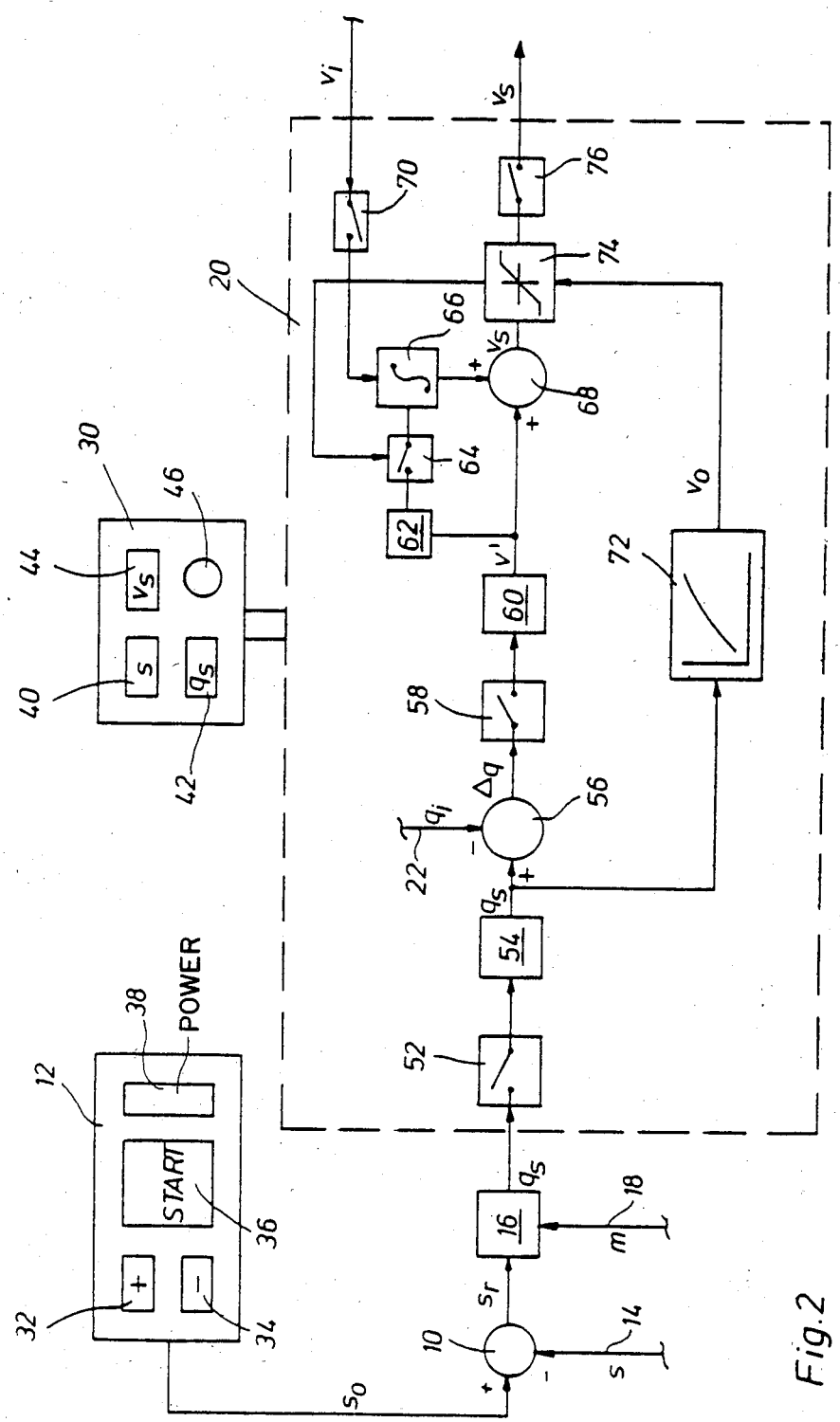
FIG. 2 depicts details of the block diagram of FIG. 1.

Details of the arrangement of FIG. 1, and especially of the consumption control 20, will now be described with reference to FIG. 2.

The input unit 12 comprises an add (+) button 32 and a subtract (−) button 34 for integrally setting a desired distance $s_o$, a start button 36, and an on-off switch 38.

The indicator 30 comprises 40, 42 and 44 for the total distance $s_o$ to be driven and/or the remaining distance $s_4$, for the permissible consumption $q_s$, and for the permissible speed $v_s$, respectively, as well as an indicator light 46.

The output of the divider 16 is connected to a switch or latch 52 which at constant intervals of time or distance passes the output signal $q_s$ of the divider 16 to a zero order memory or register 54.

The output of the memory 54 is connected to an input of a subtractor 56 the output of which is a signal $\Delta q$.

The signal $\Delta q$ corresponds to the difference between the signal $q_s$ stored in the memory and the signal $q_i$ coming from the line 22.

The output of the subtractor 56 is connected to a proportional member 60 by way of a switch 58. The switch 58 opens whenever a brake or a clutch or both are actuated, or when the accelerator is fully depressed. The proportional member 60 is adjustable and when the switch 58 is closed, a signal $v'$ which is proportional to the signal $\Delta q$ appears at its output. The output of the proportional member 60 is connected directly as well as indirectly to the input of an adder member 68. The indirect connection leads through a further proportional member 62 for setting the reset interval, a switch 64 and an integrator 66.

The components 60, 62, 64, 66, and 68 constitute a PI-control (proportional-integral control) in a well-known manner.

A switch 70 is provided for setting the integrator 66, the switch 70 serving to input the actual speed of the vehicle into the integrator 66 as an initial value.

The output of a function generator 72 is connected to an input of a limiter 74 another input of which is connected to the output of the adder 68. Within the function generator 72 there are stored values of median or average speeds $v_o$ resulting from, or corresponding to permissible consumption rates $q_s$ under normal operating conditions. The limiter 74 limits the upper and lower values of the output signal $v_s$ of the adder 68 corresponding to the permissible speed.

The limiting values depend upon the output signal $v_o$ of the function generator 72 at any given instant. In other words, the output signal cannot exceed the maximum and minimum values set by the limiter 74 on the basis of the instantaneous signal $v_o$ from the function generator 72. In either case the switch 64 is opened and prevents overloading the proportional-integral control. The output of the limiter 74 is connected to the speed control 24 by way of a switch 76 which may be connected to the switch 58 in such a manner that they act together.

The described system functions in the following manner:

Initializing

When the system is turned on by actuating the on-off switch 38, the following events occur:

all components are energized;

the distance measuring device 15 which forms part of the drive train 26 but is not described in detail, is reset to s=0;

the contents of the fuel tank m=$m_o$ is read into the divider 16, e.g. $m_o$=70 liters;

the maximum distance $s_o$ which may be driven with the available fuel $m_o$ is rendered visible in the display 40 of the indicator 30, e.g. 700 kilometers, the distance having been calculated by a calculator (not shown) on the basis of $m_o$ and a reasonable average consumption rate, e.g. 10 km/l, programmed into the system;

the permissible fuel consumption rate, i.e. 10 1/100 km, is calculated by the divider 16 on the basis of $s_o$ and $m_o$ and is rendered visible in the display 42;

an average speed $v_o$, e.g. 110 km/h, is determined by the program curve in the program generator 72, and is shown in the display 44;

the actual speed $v_i$ of the vehicle is input as the initial value into the integrator 66 by way of the switch 70.

By way of the add (plus) button 32 or the subtract (minus) button 34 the driver, by changing the distance $s_o$ desired, may select values for $s_o, q_s$ and $v_s$, for instance:

| $m_o = 70$ l | | |
|---|---|---|
| $s_o = 1,400$ km | or | $s_o = 1,400$ km |
| $q_s = 5$ 1/100 km | | $q_s = 5$ 1/100 km |
| $v_s = 80$ km/h | | $v_o = 150$ km/h |

Automatic Operation

If the driver actuates the start button 36 while the vehicle is driven in its highest gear and the brake is not in use, the clutch pedal is not depressed and the accelerator is not fully depressed, the switch 70 is opened. Furthermore, the switches 58 and 76 are closed and the speed control 24 receives as an initializing value the parameter $$v_s = v_i - K(q_s - q_i),$$

K being the coefficient of proportionality of the proportional member 66. The PI-control 20 is now actuated in a well-known manner to control the speed control 24. The vehicle accelerates or decelerates in such a manner that $q_s - q_i$ approaches 0.

If the desired speed value $v_s$ owing to elevations or declines in the road, exceeds one of its limits, for instance, 80% of the lowest or 120% of the highest value of $v_o$, the consumption control loop is opened by the switch 64 and the speed is maintained at its lower or upper limit. The adjustment in $q_s$ which thus becomes necessary is accomplished by the divider 16. The output signal of the divider 16 is fed into the memory 54 by way of the switch 52 after a predetermined interval of time or distance. A new speed value $v_o$ with new limiting values is determined by the function generator 72 in accordance with the new value in the memory or register 54.

The limiter 74 thus serves to prevent excessive changes in speed, for instance on elevations or declines in the road. In case of long elevations or declines the switch 52 resets appropriate new desired values.

Close-Loop and Open-Loop Operation and Transition From One to the Other

If for passing another vehicle, the driver fully depressesthe accelerator or if he uses the brake to prevent collision with another vehicle, the switches 58 and 76 are opened. Thus the speed control 24 is separated from the consumption control loop in a manner known per se. Also, the switch 70 is closed. Desired consumption rate $q_s$ and the initalizing value of the integrator 66 remain unchanged and are not affected by the fact that the control loop has been opened. Thus, when the switches 58 and 76 are closed again, and the switch 70 is opened again, the consumption control resumes operation smoothly with actualized desired values. While the control loop is open the lamp 46 in the indicator 30 lights up (an acoustic indicator coupled with the lamp 46 may release an audible signal as well) to indicate that the output signal $q_s - q_i$ of the subtractor 56 exceeds 0.

Changes in Desired Values During Closed-Loop Operation

By using one of the buttons 32 or 34 the distance to be driven may be changed at any time whereby the system adjusts the values $v_o$ and $q_s$ to the new desired distance.

Non-Automatic Operation

If the start button 36 is not actuated, the operation is identical to the operation when the switches 58 and 76 are in their open condition, as described supra.

In this manner the driver, guided by an optical signal 46 and/or an acoustical signal, may drive the vehicle for a predetermined distance.

Neither input unit 12 nor indicator 30 nor their construction are described in detail as much components and their connection to other components is well known in the art.

Figure 3:
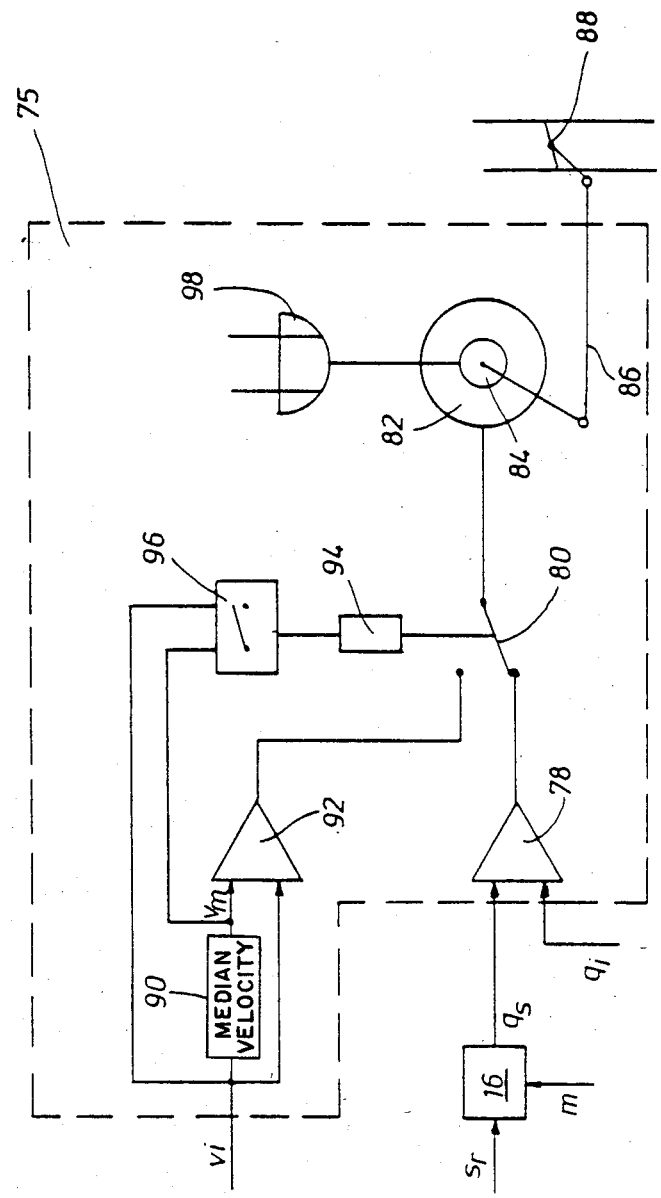
FIG. 3 is a block diagram of another embodiment of the invention.

FIG. 3 is a block diagram of another embodiment of the invention. In accordance with this embodiment the output of the divider 16 is connected to a differential amplifier 78. The divider 16 receives a signal $s_r$ corresponding to the distance remaining and a signal m corresponding to the available fuel supply. A signal $q_i$ corresponding to the actual consumption rate is fed to the other input of the differential amplifier 78. The output of the amplifier 78 is a signal proportional to the difference of $q_s$ and $q_i$ and is fed to a servo motor 82 by way of one contact of a switch 80. The motor 82 is connected to a throttle valve 88 in an intake manifold of a combustion engine, by way of a clutch 84 and a linkage 86.

Furthermore, there is provided a generator 90 for generating a mean value $v_m$ of $v_i$ over a predetermined interval of distance or time. The signal $v_i$ corresponding to the actual speed is fed to the input of the generator 90. The output $v_m$ of the generator 90 is fed to a differential amplifier 90 the other input of which receives $v_i$ also.

The output of the differential amplifier 92 is connected to the other one of the two contacts of the switch 80. The switch 80 is actuated by a relay 94. The rela 94 is connected to a switch 96 which energizes the relay 94 whenever the difference between $v_i$ and $v_m$ exceeds a predetermined value.

A logic gate 98 causes the clutch 84 to disengage in response to operation of the brake or the clutch (neither shown) of the vehicle.

The system operates in the following manner:

Assuming the vehicle is moving at a substantially constant speed, the switch 80 connects the differential amplifier 78 with the servo motor 82. The motor 82 is such that it reverses its rotation when the polarity of the output signal of the amplifier 78 is reversed. The rotational speed of the motor 82 is proportional to the level of the output signal of the amplifier 78. The motor 82 maintains the throttle valve 88 in a position in which actual $q_i$ and desired $q_s$ consumption rates are substantially equal.

If the vehicle is driven up an elevation in speed naturally decreases if the fuel consumption rate q remains constant. If the speed changes by more than a predetermined value, the switch 96 is closed disconnecting the differential amplifier 78 and, hence, the consumption control and activating the speed dominated control of the amplifier 92. The motor 82 now moves the throttle 88 into a position in which $v_i$ approaches $v_m$. In this manner smooth speed of the vehicle is maintained which is conducive to smooth traffic flow. As soon as the switch 96 opens owing to the increased speed, the swicth 80 again connects the differential amplifier 78 with the motor 82, and the throttle valve 88 moves into a position in which the actual consumption rate $q_i$ corresponds to the new desired rate $q_s$.

As will be appreciated by those skilled in the art, the invention provides for an efficient system for maximizing fuel consumption efficiency by permitting automatic operation of a motor vehicle in such a manner that a given distance may be driven with an available quantity of fuel. At the same time the system permits overriding of the automatic controls to permit discretionary operation of the vehicle whenever the automatic control does not suit a particular traffic condition.

It is believed that the advantages of the system described are apparent. Certain changes and modifications may be made to the invention without departing from its scope or spirit.

What is claimed is:

1. A method of operating an automotive vehicle with a given quantity of fuel for a predetermined distance, comprising the steps of:
    generating a first signal representative of the predetermined distance;
    measuring the given quantity of fuel and generating a second signal representative thereof;
    deriving from said first and second signals a third signal representative of a permissible rate of fuel consumption for operating the vehicle for said predetermined distance;
    measuring the actual rate of fuel consumption for generating a fourth signal representative thereof;
    comparing said third and fourth signals for deriving a fifth signal representative of the difference between said actual and permissible rates of consumption; and
    feeding said fifth signal to an output control member of the drive train of said automotive vehicle for adjusting the output thereof such that the actual rate of consumption substantially equals the permissible rate.

2. The method of claim 1, further comprising the steps of measuring the speed of the vehicle and of adjusting the rate of actual consumption to the rate of permissible consumption by adjusting the speed.

3. The method of claim 1, further comprising the step of periodically undating the third signal by periodically adjusting the first and second signals in accordance with the distance remaining to be driven and the remaining quantity of fuel.

4. A device for operating an automotive vehicle with a given quantity of fuel for a predetermined distance, comprising:
    means for generating a first signal representative of the predetermined distance;
    means for measuring the given quantity of fuel and for generating a second signal representative thereof;
    means for calculating from said first and second signals a value representative of a permissible rate of fuel consumption for operating the vehicle for said predetermined distance and for generating a third signal representative of said value;
    means for measuring the actual rateof fuel consumption and for generating a fourth signal representative thereof;
    means for comparing said third and fourth signals and for deriving a fifth signal representative of the difference between the permissible and actual rates of consumption; and
    means responsive to said fifth signal and cooperating with an output control member of the drive train of said automotive vehicle for adjusting the output thereof such that the actual rate of consumption substantially equals the permissible rate.

5. The device of claim 4, wherein said means for comparing comprises means for generating a perceptible signal when the actual rate of consumption exceeds the permissible rate.

6. The device of claim 5, wherein said perceptible signal generating means comprises a visually perceptible warning light.

7. The device of claim 5, wherein said perceptible signal generating means comprises means for generating an audibly perceptible signal.

8. The device of claim 4,
    wherein said means for generating said first signal comprises manually operable keyboard means connected to said means for calculating by way of subtraction means.

9. The device of claim 8, further comprising:
    means for measuring a distance driven since the generation of said first signal and connected to said subtraction means, said subtraction means providing to said calculating means a signal representative of a distance still to be driven for updating said third signal.

10. The device of claim 9, further comprising:
    means for updating said third signal at predetermined intervals.

11. The device of claim 10, wherein said predetermined intervals are intervals of time.

12. The device of claim 10, wherein said predetermined intervals are intervals of distance.

13. The device of claim 10, further comprising:
    means for monitoring the speed of said vehicle; and
    means for limiting the effect of said fifth signal on the output control member so as to maintain changes in the speed of said vehicle within upper and lower limits, said upper and lower limits being a function of the speed and/or of the rate of fuel consumption of said vehicle during a predetermined prior interval of time and/or of distance.

14. The device of claim 4, wherein said output control member comprises a speed control means and wherein the control signal of said speed control means is idential to said fifth signal from said comparing means.

15. The device of claim 13, wherein said output control member comprises a speed control means and wherein the control signal of said speed control means is identical to said limited fifth signal.

16. The device of claim 13, wherein said means for deriving said fifth signal comprises means for producing an integrated signal of the actual speed of the vehicle, means for generating a signal proportional to the difference between the rates of actual and permissible fuel consumption, and means for adding said integrated and proportional signal for deriving said fifth signal .

17. The device of claim 16, further comprising a function generator responsive to said third signal for generating for each rate of permissible fuel consumption a signal representative of an average speed, said average speed signal defining said upper and lower limits of said limiting means.

18. The device of claim 17, further comprising feed back means including switch means between said limiting means and said proportional signal generating means, said switch means being adapted to open said feed back means in response to said fifth signal exceeding said upper or lower limit of said limiting means as determined by said function generator.

19. The device of claim 18, further comprising manually operable means for selectively overriding said means responsive to said fifth signal, for manually operating said output control member.

* * * * *